(12) United States Patent
Chen et al.

(10) Patent No.: US 7,149,395 B1
(45) Date of Patent: Dec. 12, 2006

(54) LIGHT-ENHANCING COMPONENT AND FABRICATION METHOD THEREOF

(75) Inventors: Jyh-Shin Chen, Hsinchu (TW); Tong-Long Fu, Hsinchu (TW); Shao-Chang Cheng, Hsinchu (TW); Yu-Hsuan Lin, Hsinchu (TW); Yi-Chiuen Hu, Hsinchu (TW); Hui-Hsiung Lin, Hsinchu (TW); Hsiao-Yu Chou, Hsinchu (TW)

(73) Assignees: Instrument Technology Research Center, Hsinchu (TW); National Applied Research Laboratories, Hsinchu (TW)

( * ) Notice: Subject to any disclaimer, the term of this patent is extended or adjusted under 35 U.S.C. 154(b) by 0 days.

(21) Appl. No.: 11/200,307

(22) Filed: Aug. 9, 2005

(51) Int. Cl.
*G02B 6/02* (2006.01)
*G02B 21/00* (2006.01)
*C03B 37/00* (2006.01)
*B05D 5/06* (2006.01)

(52) U.S. Cl. .................. 385/128; 385/11; 385/123; 385/122; 385/141; 359/368; 65/385; 65/387; 65/400; 427/163.2

(58) Field of Classification Search ........... 385/123, 385/124, 126, 127, 128, 141, 37; 65/387, 65/400, 385; 359/368; 427/163.2
See application file for complete search history.

(56) References Cited

U.S. PATENT DOCUMENTS

| | | | | |
|---|---|---|---|---|
| 4,917,462 A | 4/1990 | Lewis et al. | ............... | 350/319 |
| 5,894,122 A | 4/1999 | Tomita | ................ | 250/234 |
| 5,994,691 A | 11/1999 | Konada | ............. | 250/234 |
| 6,052,238 A | 4/2000 | Ebbesen et al. | .......... | 359/738 |
| 6,194,711 B1 | 2/2001 | Tomita | .................. | 250/234 |
| 6,226,258 B1 | 5/2001 | Tominaga et al. | .......... | 369/283 |
| 6,236,033 B1 | 5/2001 | Ebbesen et al. | ............ | 250/216 |
| 6,319,582 B1 | 11/2001 | Tominaga et al. | ........ | 428/64.1 |
| 6,340,813 B1 | 1/2002 | Tominaga et al. | .......... | 250/216 |
| 6,348,251 B1 | 2/2002 | Tsai et al. | ............. | 428/64.1 |
| 6,358,589 B1 | 3/2002 | Tsai et al. | ............. | 428/64.1 |
| 6,408,123 B1* | 6/2002 | Kuroda et al. | ............. | 385/130 |
| 6,839,191 B1* | 1/2005 | Sugiura et al. | ............ | 359/738 |
| 2003/0032822 A1 | 2/2003 | Tsuji et al. | ............... | 549/529 |
| 2003/0211336 A1 | 11/2003 | Tsai et al. | ............... | 428/432 |
| 2003/0218969 A1 | 11/2003 | Tsai et al. | ............... | 369/288 |
| 2003/0218970 A1 | 11/2003 | Tsai et al. | ............... | 369/288 |
| 2005/0185186 A1* | 8/2005 | Smolyaninov et al. | ...... | 356/445 |

OTHER PUBLICATIONS

Kawazoe et. al., "Second-harmonic generation in a near field optical fiber probe.", OPTICS LETT., vol. 26, No. 21, Nov. 2001, pp. 1687-1689.*
Barnes et al., Surface Plasmon Subwavelength Optics, Nature Publishing Group, vol. 424, Aug. 14, 2003, pp. 824-830.

* cited by examiner

*Primary Examiner*—Brian M. Healy
(74) *Attorney, Agent, or Firm*—Allen, Dyer, Doppelt, Milbrath & Gilchrist, P.A.

(57) ABSTRACT

The present invention provides a light-enhancing component and a fabrication method thereof by using the focused-ion-beam. In the present invention, the surface plasmon polariton structure is coated on the surface of the optical fiber so as to form the light-enhancing component. When the light passes through the optical fiber, the luminous flux transmitted through the aperture on the surface plasmon polariton is enhanced, and the light beam smaller than the diffraction limitation can be transmitted to the far-field, i.e. the nano-optic sword is formed. The light-enhancing component of the present invention can be used for the optical data storage, the optical microscopy, the biomedical detections and the lithography to perform the extra optical resolutions beyond the diffraction limitation.

19 Claims, 4 Drawing Sheets

LIGHT-ENHANCING COMPONENT AND FABRICATION METHOD THEREOF

FIELD OF THE INVENTION

The present invention relates to a light-enhancing component, and more particularly to the light enhancing component formed by a focused-ion-beam for enhancing the light beam transmitted to the far-field to be converged.

BACKGROUND OF THE INVENTION

Recently, in order to overcome the far-field diffraction limitation, the near-field scanning optical microscopy (NSOM) has been disclosed in U.S. Pat. No. 4,917,462, U.S. Pat. No. 5,894,122, U.S. Pat. No. 5,994,691, and U.S. Pat. No. 6,194,711, wherein NSOM is designed so that a probe whose aperture or radius of curvature of the tip is smaller than the wavelength of light used for measurement is placed close to the surface of a specimen, which is scanned with the probe to measure optical properties in a minute area of the specimen. NSOM is not restricted by the diffraction limit. For NSOM, while in a scattering probe, the resolving power corresponds to the order of the radius of curvature of the probe tip, and to the size of the outside diameter of the probe tip.

Due to the precise feedback control for the scanning system, the scanning velocity is slow, the scanning range is limited and the probe is easily destroyed. In order to overcome the aforesaid drawbacks and commercialize the near-field optical recording products, in U.S. Pat. No. 6,226,258, U.S. Pat. No. 6,319,582 and U.S. Pat. No. 6,340,813 in 2001 and in 2002, Junji Tominaga et al disclosed a design for increasing two nano-films, i.e. the SiN layer with a thickness of 20 nm and the Sb layer with a thickness of 15 nm, on the phase-change typed optical recording media, wherein the two nano-films played a role as the probe in the near-field microscopes to read and write the recording points smaller than the diffraction limitation. In addition, U.S. Pat. No. 6,348,251, U.S. Pat. No. 6,358,589, US patent publication No. 20030211336, US patent publication No. 20030218969, US patent publication No. 20030218970, and US patent publication No. 20030032822 also disclosed the associated the near-field optical recording medium performing the surface plasmon effects. However, the aforesaid technologies are used for the near-field application. Accordingly, the present invention provides a component and a method to overcome the far-field diffraction limitation.

There are many studies about the materials and the structures for enhancing the surface plasmon resonance. The metal has a dielectric material soldered thereon, and the dielectric constant of the dielectric material is changed when the light is coupled to the surface of the metal. Alternatively, the different incident angles are selected and the corresponding reflected light signals are measured, so that the maximal surface plasmon resonance energy is obtained. The foregoing conventional technology is broadly used for the biomedical detections and the measurements of the dielectric constants.

Based on the principle of the surface plasmon resonance, the present invention provides a component having a surface plasmon polariton structure for enhancing the light beam transmission to the far-field and changing the distribution of the light field, so as to overcome the diffraction limitation.

T. W. Ebbesen disclosed the light signal enhancement from the subwavelength aperture array, in which it was proved that the light signal is passively enhanced due to the surface plasmon polariton (SPP) phenomenon formed by the nano-structure. In U.S. Pat. No. 6,236,033, the nano-aperture and the periodic structure formed on the metal film have been disclosed for enhancing the light transmission with the specific wavelength by using the characteristics of the surface plasmon polariton. In U.S. Pat. No. 6,052,238, the near-field scanning optical microscope having a subwavelength aperture array has been disclosed to enhance light transmission. For a single nano-aperture with the periodic structure, not only the single-surface structure but also the two-surfaces structure are used for enhancing the light signal, so that the photon entanglement can be preserved or lost upon transmission through the aperture.

The present invention provides a light-enhancing component having a surface plasmon polariton structure, and provides a method for fabricating the light-enhancing component by using the focused-ion-beam.

SUMMARY OF THE INVENTION

Since the high resolution of the near-field optical scanning microscope depending on the feedback control cannot be directly performed on the far-field, and the enhanced luminous flux, the light beam adjustment and the transmission to the far-field result from the surface plasmon polariton effects, it is an aspect of the present invention to provide a light-enhancing component with the extra high optical resolution and the fabrication method thereof.

The light-enhancing component of the present invention has an optical fiber with a surface and has a surface plasmon polariton structure coated on the surface of the optical fiber. The surface plasmon polariton structure is formed on the surface of the optical fiber by a focused-ion-beam. When the light passes through the optical fiber, the enhancement of the surface plasmon polaiton is formed on the surface plasmon polariton structure by the light transmitted from the waveguide, and therefore the light transmitted from the surface plasmon polariton structure has an enhanced strength and a narrowed width to be transmitted to the far-field.

In accordance with the present invention, the width of the light is maintained under the diffraction limitation, so that the light-enhancing component can be used for the optical nano-lithography, the optical nano-detection and optical biomedical system.

The above aspects and advantages of the present invention will become more readily apparent to those ordinarily skilled in the art after reviewing the following detailed description and accompanying drawings, in which:

DETAILED DESCRIPTION OF THE PREFERRED EMBODIMENT

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
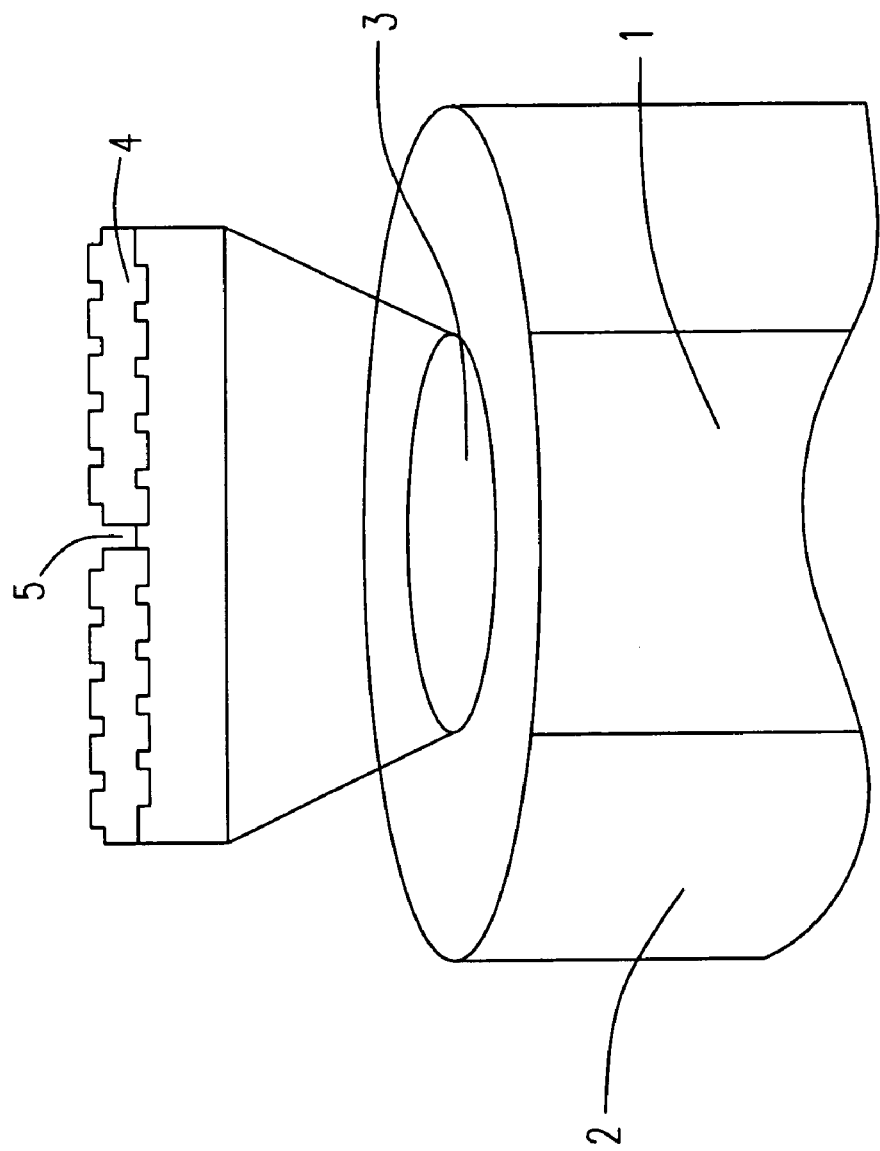
FIG. 1 is a schematic view showing the light-enhancing component of the present invention.

Please refer to FIG. 1 being the schematic view showing the structure of the light-enhancing component of the present invention, wherein the light-enhancing component includes a core 1, a cladding 2, a surface 3, a surface plasmon polariton structure 4 coated on the surface 3, and a nano-aperture 5 on the center of the surface plasmon polariton structure 4. The core 1 and the cladding 2 are made of $SiO_2$ glass, doped $SiO_2$ glass or the transparent polymer. The core 1 and the cladding 2 have the characteristics of the waveguide due to the variable refractive index of the material thereof. The core 1 can be a single-mode optical fiber, a multi-mode optical fiber or a polarization-mode optical fiber in response to different wavelengths emitted from a light source. The surface 3 can be a flat plane, a linear-curved surface or a non-linear-curved surface.

The surface plasmon polariton structure 4 coated on the surface 3 is made of one selected from a group consisting of Zn, Si, Ni, Sb, Ag, Ge, Al, Cu, Pt, Co, Mn, Cr, Ti, Na, Ga, As, Se, In, Sn, Te, Au, Fe and a combination thereof. The surface plasmon polariton structure 4 has a thickness ranged from 100 nm to 700 nm. The surface plasmon polariton structure 4 is a periodic structure or a periodic-like structure, and has a shape being one of a polygon, an arc and a specific-curved shape. The surface plasmon polariton structure 4 can be a one-sided single layer structure or a two-sided single layer structure. When the surface plasmon polariton structure 4 is the one-sided single layer structure, the periodic structure or the periodic-like structure has a period ranged from 100 nm to 800 nm.

The nano-aperture 5 on the center of the surface plasmon polariton structure 4 is smaller the aperture for the optical diffractive limitation, and has a size matching the half periodic length of the surface plasmon polariton structure 4. Preferably, nano-aperture 5 has a size ranged from 50 nm to 400 nm FIGS. 2(a)–2(d) are diagrams showing the fabrication of one-sided surface plasmon polariton structure coated on the surface of optical fiber according to the present invention.

Figure 2A:
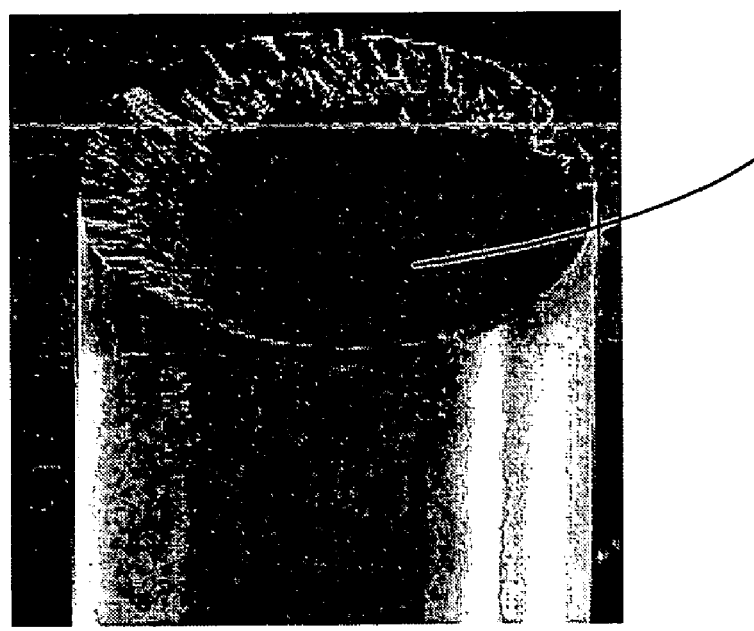
FIG. 2(a) is a schematic view showing the surface of the light-enhancing component according to the present invention.

Referring to FIG. 2(a), the surface 3 of the light-enhancing component has a flat plane, and the metal film 6 is deposited on the surface 3, so that the charge accumulation is reduced during the fabrication.

Figure 2B:
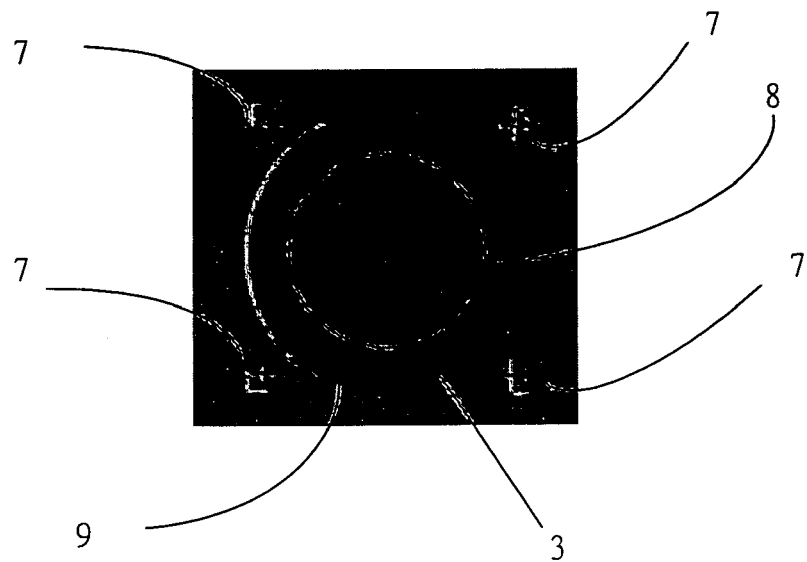
FIG. 2(b) is a schematic view showing the core of the light-enhancing component and the metal film around the core according to the present invention.

Referring to FIG. 2(b), four positioning indices 7 are formed around the core 1 by using a focused-ion-beam in order to facilitate the positioning of the core. The core 1 is approximately positioned on the dotted line 8. Then, the metal film 6 on the surface 3 is etched by the focused-ion-beam to form an etched area 9 larger than the core 1 (enclosed by the dotted line 8), so that the flat surface 3 is naked to be further processed.

Figure 2C:
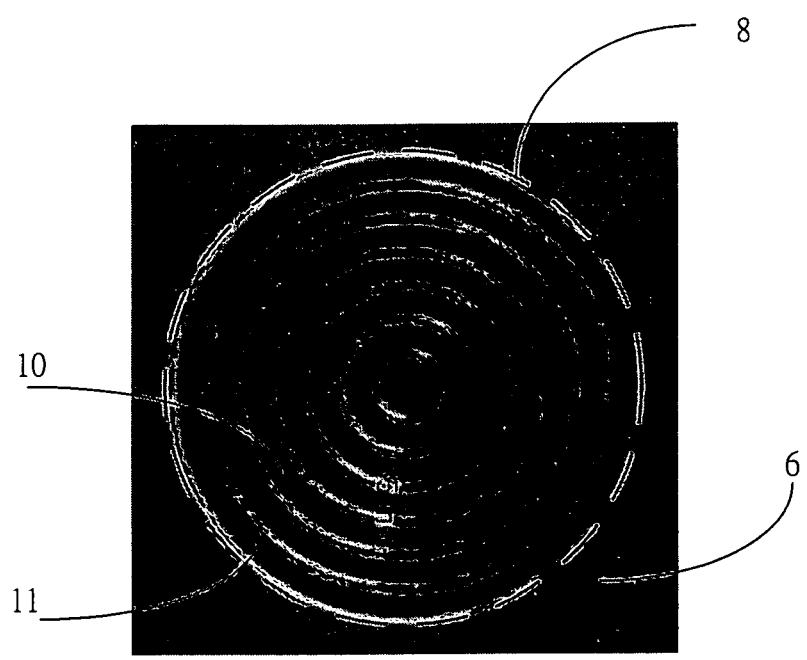
FIG. 2(c) is a diagram showing the surface plasmon polariton structure of the present invention.

Referring to FIG. 2(c), the core 1 (enclosed by the dotted line 8) positioned in the naked area 9 is etched by the focused-ion-beam, wherein there are annular ion-beams formed by a mask. The surface 3 is etched to form the annular periodic structure including the surface 10 not to be etched and the surface 11 to be etched.

Figure 2D:
FIG. 2(d) is a schematic view showing the soldered metal layer and the formed nano-aperture according to the present invention.

Please refer to FIG. 2(d) showing the fabrication of the nano-aperture 5. By using the focused-ion-beam, the metal material 12 with the surface plasmon polariton effects is deposited on the structure resulting from FIG. 2(c), wherein the metal material 12 is positioned between the area 9 and the core 1 (enclosed by the dotted line 8). The center of the annular structure as shown in FIG. 2(c) is etched to form a nano-aperture 5, and therefore the one-sided single layer of the light-enhancing component is formed. If the metal material 12 is further fabricated by the focused-ion-beam to form the periodic or the periodic-like structure, the two-sided light-enhancing component is formed.

Figure 3:
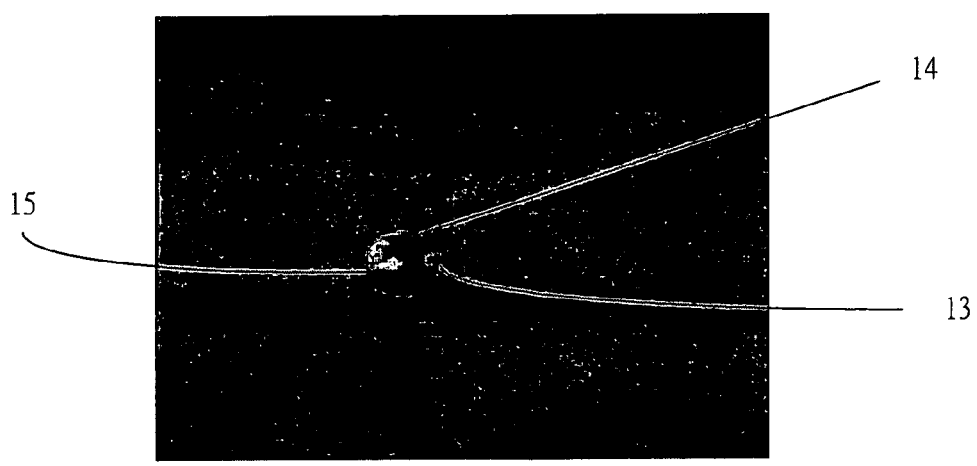
FIG. 3 is a diagram showing the measure result of the light-enhancing component according to the present invention.

FIG. 3 shows the measure result of the light-enhancing component of the present invention. The light having the wavelength ranged from 600 nm to 650 nm and emitted from the polarized laser source is guided to the single-mode optical fiber 13. When the light passes through the nano-aperture 5 smaller than the diffraction limitation, the light is transmitted to the far-field and converged as the nano-optic sword 15 due to the enforcement effects resulting from the surface plasmon polariton structure 14. Accordingly, the effect of the present invention is experimentally proved.

Accordingly, in the present invention, the optical fiber and the principle of the surface plasmon polariton are integrated, and the focused-ion-beam is used, so as to form the light-enhancing component.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light-enhancing component, comprising:
    an optical fiber having a surface; and
    a surface plasmon polariton structure coated on said surface of said optical fiber and having a center with a nano-aperture, said surface plasmon polariton structure having a periodic length and said nano-aperture having a size ranging from 50 nm to 400 nm for fitting an amount of the periodic length.

2. The light-enhancing component according to claim 1, wherein said optical fiber is a waveguide made of a $SiO_2$ glass and a doped $SiO_2$ glass.

3. The light-enhancing component according to claim 1, wherein said optical fiber is a waveguide made of a transparent polymer.

4. The light-enhancing component according to claim 1, wherein said optical fiber is one selected from a group consisting of a single-mode optical fiber, a multi-mode optical fiber and a polarization-mode optical fiber in response to different wavelengths emitted from a light source.

5. The light-enhancing component according to claim 1, wherein said surface is one selected from a group consisting of a flat plane, a linear-curved surface and a non-linear-curved surface.

6. The light-enhancing component according to claim 1, wherein said surface plasmon polariton structure is made of one selected from a group consisting of Zn, Si, Ni, Sb, Ag, Ge, Al, Cu, Pt, Co, Mn, Cr, Ti, Na, Ga, As, Se, In, Sn, Te, Au, Fe and a combination thereof.

7. The light-enhancing component according to claim 6, wherein said surface plasmon polariton structure has a thickness ranged from 100 nm to 700 nm.

8. The light-enhancing component according to claim 7, wherein said surface plasmon polariton structure is one of a periodic structure and a periodic-like structure.

9. The light-enhancing component according to claim 8, wherein said surface plasmon polariton structure is one of a multi-layer structure and a single-layer structure with a periodic length ranged from 100 nm to 800 nm.

10. The light-enhancing component according to claim 1, wherein said nano-aperture fits a half of said periodic length.

11. The light-enhancing component according to claim 1, wherein said nano-aperture has a shape being one selected from a group consisting of a polygon, an arc and a specific-curved shape.

12. A method for fabricating a light-enhancing component by using a focused-ion-beam, comprising steps of:
   (a) pretreating an optical fiber;
   (b) etching said optical fiber to form a naked surface of said optical surface;
   (c) etching said naked surface of said optical fiber;
   (d) forming said surface plasmon polariton structure; and
   (e) forming a nano-aperture on said surface plasmon polariton structure, said surface plasmon polariton structure having a periodic length and said nano-aperture having a size ranging from 50 nm to 400 nm for fitting an amount of said periodic length.

13. The method according to claim 12, wherein said optical fiber is treated to have a surface being one selected from a group consisting of a flat plane, a linear-curved surface and a non-linear-curved surface, and an electrically conductive metal film is deposited on said surface in said step (a).

14. The method according to claim 13, wherein said optical fiber has a core, and said electrically conductive metal film is etched, so as to have an etched area bigger than said core in said step (b).

15. The method according to claim 14, wherein said electrically conductive metal film is etched to expose said surface to be said naked surface of said optical fiber.

16. The method according to claim 14, wherein said naked surface has an area to be etched, and said core of said optical fiber is covered by said area of said naked surface in said step (c).

17. The method according to claim 12, wherein said surface plasmon polariton structure is made of one selected from a group consisting of Zn, Si, Ni, Sb, Ag, Ge, Al, Cu, Pt, Co, Mn, Cr, Ti, Na, Ga, As, Se, In, Sn, Te, Au, Fe and a combination thereof.

18. The method according to claim 12, wherein said optical fiber has a core, and said core is covered by said surface plasmon polariton structure.

19. The method according to claim 12, wherein said aperture is etched to said naked surface of said optical fiber.

* * * * *